US 6,240,399 B1

(12) United States Patent
Frank et al.

(10) Patent No.: US 6,240,399 B1
(45) Date of Patent: May 29, 2001

(54) SYSTEM AND METHOD FOR OPTIMIZING INVESTMENT LOCATION

(76) Inventors: Glenn Frank, 5 Orlean Rd., Burlington, MA (US) 01803; Jay Whittaker, 47 Colburn Rd., Wellesley Hills, MA (US) 02481; Robert Keller, 2 Deerfoot Trail on Partridge Hill, Harvard, MA (US) 01451

( * ) Notice: Subject to any disclaimer, the term of this patent is extended or adjusted under 35 U.S.C. 154(b) by 0 days.

(21) Appl. No.: 09/346,602

(22) Filed: Jul. 2, 1999

Related U.S. Application Data
(60) Provisional application No. 60/113,859, filed on Dec. 24, 1998.

(51) Int. Cl.[7] .................................................... G06F 17/60
(52) U.S. Cl. ............................................................... 705/36
(58) Field of Search .................................................. 705/36

(56) References Cited

U.S. PATENT DOCUMENTS

| | | | |
|---|---|---|---|
| 5,255,345 | * 10/1993 | Shaefer | 395/13 |
| 5,404,516 | * 4/1995 | Georgiades et al. | 395/650 |
| 5,761,422 | * 6/1998 | Barr et al. | 395/236 |
| 5,819,244 | * 10/1998 | Smith | 706/13 |
| 6,021,397 | * 2/2000 | Jones et al. | 705/36 |

FOREIGN PATENT DOCUMENTS 0 572 281 A1 * 12/1993 (EP) ................................. G06F/15/30

OTHER PUBLICATIONS

Jacqueline Shoaf et al., "The Efficient Set GA for Stock Portfolios", Evolutionary Computation Proceedings, May 1998, p. 354–359.*

Fred Glover et al., "New Advances and Applications of Combining Simulation and Optimization", Proceedings of the 1996 Winter Simulation Conference, p. 144–152.*

Suleiman K. Kassicieh et al., "Investment Decisions Using Genetic Algorithms", Proceedings of the Thirtieth Hawaii International Conference on System Sciences, 1997, p. 484–490.*

Suran Goonatilake, "Intelligent Hybrid Systems for Financial Decision Making", Proceedings of the 1995 ACM Conference on Applied Computing, p. 471–476.*

Dennis Murray, "Ernst & Young's Prosper", Medical Economics, Nov. 11, 1996, p. 159–160.*

Deborah K. Wong, "WinLab Reviews Software Prosper 2.0", Windows Magazine, May 1997.*

Oliver V. Pictet et al., "Genetic Algorithms with collective sharing for Robust Optimization in Financial Applications", Jan. 22, 1996, p. 1–14.*

O'Connell, Vanessa "Capital–Gains Tax Cuts Mean It's Time To Review Your Tax–Deferral Strategy," Wall Street Journal (Aug. 29, 1999) p. C1.

* cited by examiner

Primary Examiner—Eric W. Stamber
(74) Attorney, Agent, or Firm—David D. Lowry; Brown, Rudnick, Freed & Gesmer, P.C.

(57) ABSTRACT

An investment optimizing system and method. Once an investor or investment advisor determines the appropriate asset allocation and that there are both taxable accounts and tax-deferred investment accounts, the invention will optimize/maximize the investor's ending after-tax asset accumulation, which is the objective of all investors. This is accomplished by allocating the chosen investment vehicles between the taxable and tax-deferred accounts in an optimum way. The invention runs on a computer system and searches for an allocation which results in a maximal return. Intelligent heuristics measure increased performance based on different asset allocations.

14 Claims, 8 Drawing Sheets

Asset Classes for Fidelity, Joe                                                        Total Assets: $400,000

| Asset Class | Asset Type | Percent Taxed Federal | State | Ordinary Income | Yield | L/T CG Distrib | Unrealized Appreciation | Pct Alloc: 100% | Amt Alloc: $400,000 | In Taxable | In Tax Deferred |
|---|---|---|---|---|---|---|---|---|---|---|---|
| Fixed Income | Bond | 0.0% | 0.0% | 0.0% | 3.0% | 0.0% | 0.0% | 5.0% | $20,000 | 5.0% | 0.0% |
| Mass Muni MM | Avg TurnOver(yrs): | | 10 | 0% | Cap Gains Tax | | | Tax Bracket: | | $20,000 | $0 |
| Fixed Income | Bond | 100.0% | 0.0% | 0.0% | 6.0% | 0.0% | 0.0% | 25.0% | $100,000 | 0.0% | 25.0% |
| Spartan Gov't Income | Avg TurnOver(yrs): | | 10 | 20% | Cap Gains Tax | | | Tax Bracket: | 31% | $0 | $100,000 |
| International | Stock | 100.0% | 100.0% | 1.0% | 0.0% | 2.0% | 7.0% | 10.0% | $40,000 | 10.0% | 0.0% |
| Spartan Int'l Index | Avg TurnOver(yrs): | | 10 | 20% | Cap Gains Tax | | | Tax Bracket: | 37% | $40,000 | $0 |
| US Equity | Stock | 100.0% | 100.0% | 2.0% | 0.0% | 2.0% | 6.0% | 50.0% | $200,000 | 37.5% | 12.5% |
| Fidelity Fund | Avg TurnOver(yrs): | | 10 | 20% | Cap Gains Tax | | | Tax Bracket: | 37% | $150,000 | $50,000 |
| US Equity | Stock | 100.0% | 100.0% | 1.0% | 0.0% | 4.0% | 7.0% | 10.0% | $40,000 | 10.0% | 0.0% |
| Small Cap Selector | Avg TurnOver(yrs): | | 10 | 20% | Cap Gains Tax | | | Tax Bracket: | 37% | $40,000 | $0 |

Asset Allocation to achieve a value of $8,938,439 in March 2039
This is an 11.0% improvement ($887,746) over your current allocation strategy. — 76

| | Account Type | | |
|---|---|---|---|
| | Taxable | Tax Deferred | Value at Horizon |
| Spartan Gov't Income - Fixed Income | $100,000 (25.0%) | $0 (.0%) | $506,644 (5.7%) |
| Current: | $0 | $100,000 | $648,000 |
| Mass Muni MM - Fixed Income | $20,000 (5.0%) | $0 (.0%) | $65,241 (.7%) |
| Current: | $20,000 | $0 | $65,241 |
| Spartan Int'l Index - International | $39,982 (10.0%) | $18 (.0%) | $941,797 (10.5%) |
| Current: | $40,000 | $0 | $941,708 |
| Small Cap Selector - US Equity | $142 (.0%) | $39,858 (10.0%) | $2,342,697 (26.2%) |
| Current: | $40,000 | $0 | $1,728,838 |
| Fidelity Fund - US Equity | $89,877 (22.5%) | $110,123 (27.5%) | $5,082,060 (56.9%) |
| Current: | $150,000 | $50,000 | $4,666,906 |
| Totals | $250,001 | $149,999 | $8,938,439 |

SYSTEM AND METHOD FOR OPTIMIZING INVESTMENT LOCATION

RELATED APPLICATION

The present application claims the benefit of U.S. Provisional Application No. 60/113,859 filed on Dec. 24, 1998, which is incorporated herein by reference.

FIELD OF INVENTION

The present invention is directed towards financial analysis, and more particularly towards investment location optimization software.

BACKGROUND

Recent changes in the tax code and the ability of individuals to manage the investment of their retirement accounts have created many opportunities for maximizing growth over time, but have also introduced a new level of complexity into individual investment decision. Determining the best investments and strategy is a daunting task. A fundamental problem faced by all investors and financial advisors is which account—retirement or taxable—to put each investment in with their given asset allocation. Two factors strongly influence these decisions. First is the asset classes, such as stocks and bonds (and their sub categories) each which has various advantages and disadvantages, including expected return and risk. Second is the tax status of both the investor and the investment, which typically breaks down into taxable investment accounts and tax deferred investment accounts (e.g., 401Ks and IRAs). A decision must be made about how to distribute the asset classes between the taxable accounts and tax deferred retirement accounts. For example, if a split of 60% stock (or stock funds) and 40% bonds (or bond funds) make sense for an investor (it's an appropriate asset allocation), and this investor has $75,000 in an IRA and $25,000 in a taxable brokerage account, the question is "where should the $60,000 stock and the $40,000 bond allocations be located for maximum long-term benefits?" Should he hold the stocks entirely in the retirement account or hold $25,000 in the taxable account and $35,000 in the IRA? The present investment addresses and optimizes this question.

Because of the different income and growth characteristics of investments in the various asset classes and the different ways and rates at which they are taxed, and by whom (Federal, state, local) the decision about which account to put each asset class (investment) has a very significant impact on the after-tax investment accumulation over time. Financial advisors have been forced to "optimize" as best they could by applying their knowledge of each investments' characteristics and knowledge of the tax laws to approximate what they thought would be the highest after tax accumulation for the target investment horizon. The process is very much a "seat of the pants" exercise and the outcome depends on the advisor's level of knowledge and their ability to mentally integrate and process a set of highly complex variables.

As with any uncertain process, advisors and experts disagree upon the best strategy for investment. An article by Venessa O'Connell in the Wall Street Journal (Capital-Gains Tax Cuts Mean It's Time To Review Your Tax-Deferred Strategy, WSJ Aug. 29, 1997 page C1) stated that the question of whether to keep stocks or bonds in tax-deferred accounts has been debated among the wealthy for years. The article further went on to quote Harold Evensky, a highly respected financial advisor at Evensky, Brown & Katz in Florida, who recommended that high-income investors keep stocks in taxable accounts and favor corporate bonds in tax-deferred accounts. However, this general advice may not prove optimal, as will be shown below.

While experts disagree on even the basic strategies, the typical investor often doesn't even address the issue. Financial advisors often spend too little time on the issue of investment location, thereby ending up with less than optimal investment strategies. More often than not individual investors are oblivious of the issue to their financial detriment.

Several tools and systems attempt to address this problem. Spreadsheets can be constructed to "run the numbers", but the outcome depends on the input into the system. By changing input assumptions it is possible to test different scenarios to see which combination gave the best result. While this is an improvement over the "seat of the pants" method, it is not a true optimizer.

Similarly, commercial calculators may become available which obviate the need to construct spread sheets, but perform essentially the same function as the spreadsheets. The commercial calculators calculate accumulation amounts over time based on a set of assumptions. By changing the assumptions, the user is able to test different sets of assumptions (strategies). This is an incredibly time consuming and burdensome task given the number of variables and the possible number of combinations. A large number of variables must be considered with a huge search space. For example, 80 variables will result in over 14 billion possible combinations. None of the above approaches will yield an optimum solution.

There are several other approaches for developing an optimization solution for this complex problem with varying degrees of success. A brute force approach is simply to try every possible combination and calculate the best result. This can work fine, but with real world problems, the number of combinations is so large that this approach is not practical given a reasonable time scale.

Numerical calculator optimization techniques have been used to attempt to solve optimization problems and are now available in most advanced spreadsheet programs. But these techniques have limitations. For example, they lend themselves to optimizing independent numeric inputs from which a desired output is calculated. They are less capable of optimizing problems involving sequencing or scheduling. Also, they are "exploitation" and not "exploration" techniques. This means that given a reasonable starting solution (a set of input values), the numeric optimization will converge to a near optimal solution. However, they are not capable of exploring areas of space where good solutions exist. This is because numerical optimization techniques can often get trapped in local optimal solutions. Another limitation of numerical optimization techniques is that they are not suitable if the outcome cannot be explicitly calculated. For example, when the outcome is a subjective assessment by an expert or an observed performance.

Another approach is the use linear program techniques. These can work well when optimizing the numeric parameters of a recipe type problem. However, with the particular type of optimization problem related to investment account selection, it becomes very difficult to represent the problem in terms of linear numeric parameters. Also, as the number of parameters and equations increase, the calculations and solution surface become extremely complex. Further, false optimum solutions are prevalent, with no clear indication of recognizing the false solutions.

None of these approaches help to find an optimal solution in a reasonable amount of time (both real time and computer time).

SUMMARY OF THE INVENTION

The present invention comprises an investment location optimizer. Once an investor or investment advisor determines the appropriate asset allocation (investment mix) and that there are both taxable accounts and tax-deferred investment accounts, the invention will optimize/maximize the investor's ending after-tax asset accumulation, which is the objective of all investors. This is accomplished by allocating the chosen investment vehicles between the taxable and tax-deferred accounts in an optimum way.

The present invention includes a system for determining an investment strategy for an entity with assets in taxable and tax-deferred accounts. It includes an account information input component, to accept information regarding the assets in the taxable and tax-deferred accounts for the entity; an investment selection input component, to accept information regarding a plurality of investments, including an indication of a percentage amount to invest in each of the plurality of investments; an account amount selection component, to select an amount to invest from the taxable accounts and tax-deferred accounts in the plurality of investments which substantially matches the indication of a percentage amount to invest in each of the plurality of investments; and a time horizon input component, to accept an indication of a time horizon. A return on investment calculation component, then calculates a return on investment for the entity based on the information regarding the assets, the information regarding a plurality of investments, the indication of a percentage amount, the selected amount to invest from the taxable and the tax-deferred accounts, and the indication of a time horizon. The account amount selection component selects an amount from the taxable and tax-deferred accounts in order to produce a maximal return on investment for the entity at the time horizon.

In one embodiment, the account amount selection component randomly selects amounts from the taxable and tax-deferred accounts, and the return investment calculation component calculates a return for the entity based on the randomly selected amounts. The steps of randomly selecting amounts from the taxable and tax-deferred accounts and calculating a return are performed a plurality of times, and the system outputs selected amounts from the taxable and tax-deferred accounts which produce a maximal return.

In another embodiment, the account amount selection component selects an amount from the taxable and tax-deferred accounts using Genetic Algorithms (GA) in order to produce a maximal return on investment for the entity at the time horizon. This embodiment includes a chromosome structure, for use with the Genetic Algorithms, wherein the chromosome structure includes a plurality of values, each value being an indication of an amount from the tax-deferred accounts to invest in a selected one of the plurality of investments.

Advantages of the present invention include optimization of investment outcome when there are two basic kinds of investor accounts: 1) taxable accounts and 2) tax-deferred accounts such as IRA and 401(k) accounts. In addition there are other kinds of investor accounts with their own unique tax characteristics that can be incorporated into the present invention. This would provide a broader and far more complex selection optimization.

The present invention rose from the need to help make optimal decisions for clients and investors. The total asset accumulation in an investor's portfolio over time will vary dramatically depending on the decision of which account to invest in which asset class. Through the use of the present invention, the inventors are able to increase the terminal portfolio value typically between 5 and 40% with no increase in risk to the investor. The risk lies with the asset allocation and specific investments selection not where they are located. All relevant variables have been incorporated into the present invention in order to truly optimize the end period accumulations.

The illustrative embodiment of the present invention comprises a hybrid GA-Heuristic search strategy. The hybrid approach is reflected both in the implementation of the GAs and the methodology of applying it to solve problems.

In broad terms, the following are the five steps to determine the optimum investment portfolio for each client, as outlined in FIG. 1. Fact gathering 20 includes setting goals, identifying risk tolerance, making retirement projections, agreeing on the appropriate time horizons and identifying the available investments. The next step is Asset Allocation 22. Studies show that 50 to 90% of total pre-tax returns are determined by asset allocation. Given the results of the fact finding phase 20, determining the appropriate mix between stocks (domestic, international, small cap, large cap), bonds (short-term, long-term, domestic, international, tax exempt), and cash which makes the most sense for them is among the most important decisions in the investment process.

In the step of Investment Selection 24, investors choose among the available investment options in each asset category to fund the asset allocation chosen in Step 22. The investor will select from the available mutual funds or individual stock, bonds and money market instruments. Then there is Account Selection 26, which includes determining which accounts (retirement/tax deferred, non-retirement/taxable, children, trusts, etc.) are best suited for the investments and asset allocation determined in Steps 22 and 24. These accounts are all taxed differently. Accordingly, this decision is primarily tax motivated with the objective of maximizing the after-tax accumulations over time.

Finally there is Monitoring 28. After implementation the ongoing monitoring of the portfolio is essential as circumstances change.

With regard to Step 26 Account Selection, there is no standard system or formula for allocation. It is here that investors and financial advisors need to make the complex decisions about in which account to place which investment. There are a great number of variables which impact the account selection decision. They include the time horizon, current and future tax brackets (both state and federal), current and future capital gains rates, relative spread between bonds (municipals, federal, corporate), portfolio turnover, investment yields and appreciation rates, and relative proportion of overall portfolio in account types (retirement, non-retirement, children, trusts).

The illustrative embodiment of the present invention simultaneously takes into account the following variables: Federal taxes including income taxes (8 brackets) and capital gains taxes (3 brackets); States taxes including income and capital gains taxes (different in all 50 states and many have multiple brackets); Investment characteristics of numerous asset classes which are defined in terms of income characteristics (including taxable, tax-exempt, growth characteristics and turnover); time horizon (in years); before and after liquidation values; proportion of assets in taxable and tax-deferred accounts; and relevant investment mix.

Advantages of the present invention include a marked level of improvement in outcome from the application of the present invention. Typically the improvement is in the 5–40% range over 20 years. This is significant, and remember, it is a complete freebie. This is, the end result of the investment process is improved significantly, with no increase in risk as it is the same investments just in better locations from a tax stand point. And, as previously discussed, the means of achieving an optimum solution is not available by any other means.

BRIEF DESCRIPTIONS OF THE DRAWINGS

The foregoing and other features and advantages of the present invention will be more fully understood from the following detailed description of illustrative embodiments, taken in conjunction with the accompanying drawings in which:

FIG. 7 is a user interface input screen for entering investment data according to an illustrative embodiment of the present invention; and FIG. 8 is a user interface output screen for displaying results according to an illustrative embodiment of the present invention.

DETAILED DESCRIPTION

Figure 1:
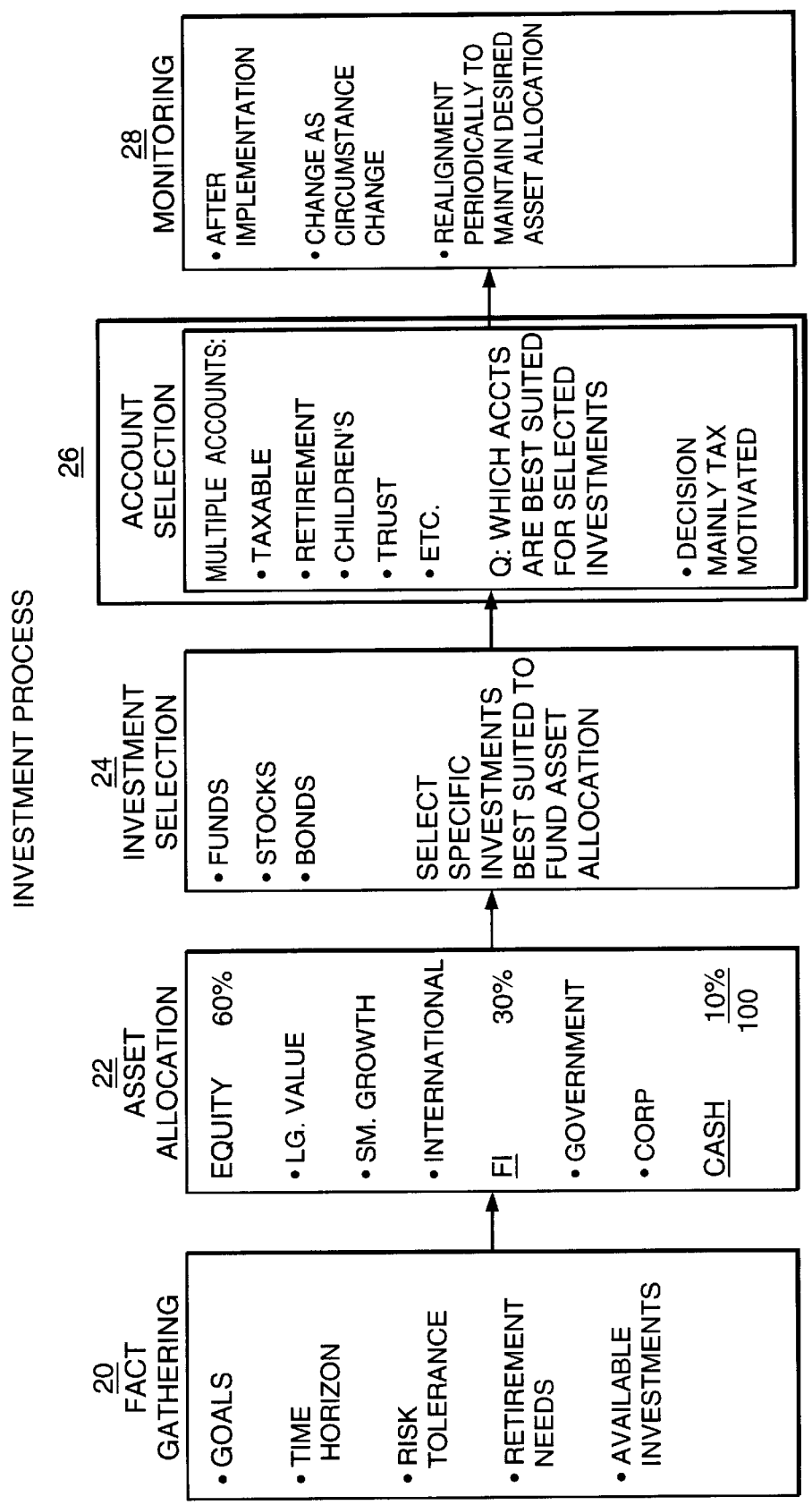
FIG. 1 is an outline of steps in an investment process.

FIG. 1 outlines steps used in planning an investment strategy for an entity, such as a person. Fact gathering 20 includes setting goals, identifying risk tolerance, making retirement projections, agreeing on the appropriate time horizons and identifying the available investments. The next step is Asset Allocation 22. Studies show that 50 to 90% of total pre-tax returns are determined by asset allocation. Given the results of the fact finding phase 20, determining the appropriate mix between stocks (domestic, international, small cap, large cap), bonds (short-term, long-term, domestic, international, tax exempt), and cash which makes the most sense for them is among the most important decisions in the investment process.

In the step of Investment Selection 24, investors choose among the available investment options in each asset category to fund the asset allocation chosen in Step 22. The investor will select from the available mutual funds or individual stock, bonds and money market instruments. Then there is Account Selection 26, which includes determining which accounts (retirement/tax deferred, non-retirement/taxable, children, trusts, etc.) are best suited for the investments and asset allocation determined in Steps 22 and 24. This decision is primarily tax motivated with the objective of maximizing the after tax accumulations over time.

Finally there is Monitoring 28. After implementation the ongoing monitoring of the portfolio is valuable as circumstances change.

Focusing on Step 26 Account Selection, there is no standard system or formula for allocating investment funds from taxable and tax-deferred accounts. It is here that investors and financial advisors need to make the complex decisions about in which account to place which investment. There are a great number of variables which impact the account selection decision. They include the time horizon, current and future tax brackets (both state and federal), current and future capital gains rates, relative spread between bonds (municipals, federal, corporate), portfolio turnover, investment yields and appreciation rates, and relative proportion of overall portfolio in account types (retirement, non-retirement, children, trusts).

Figure 2:
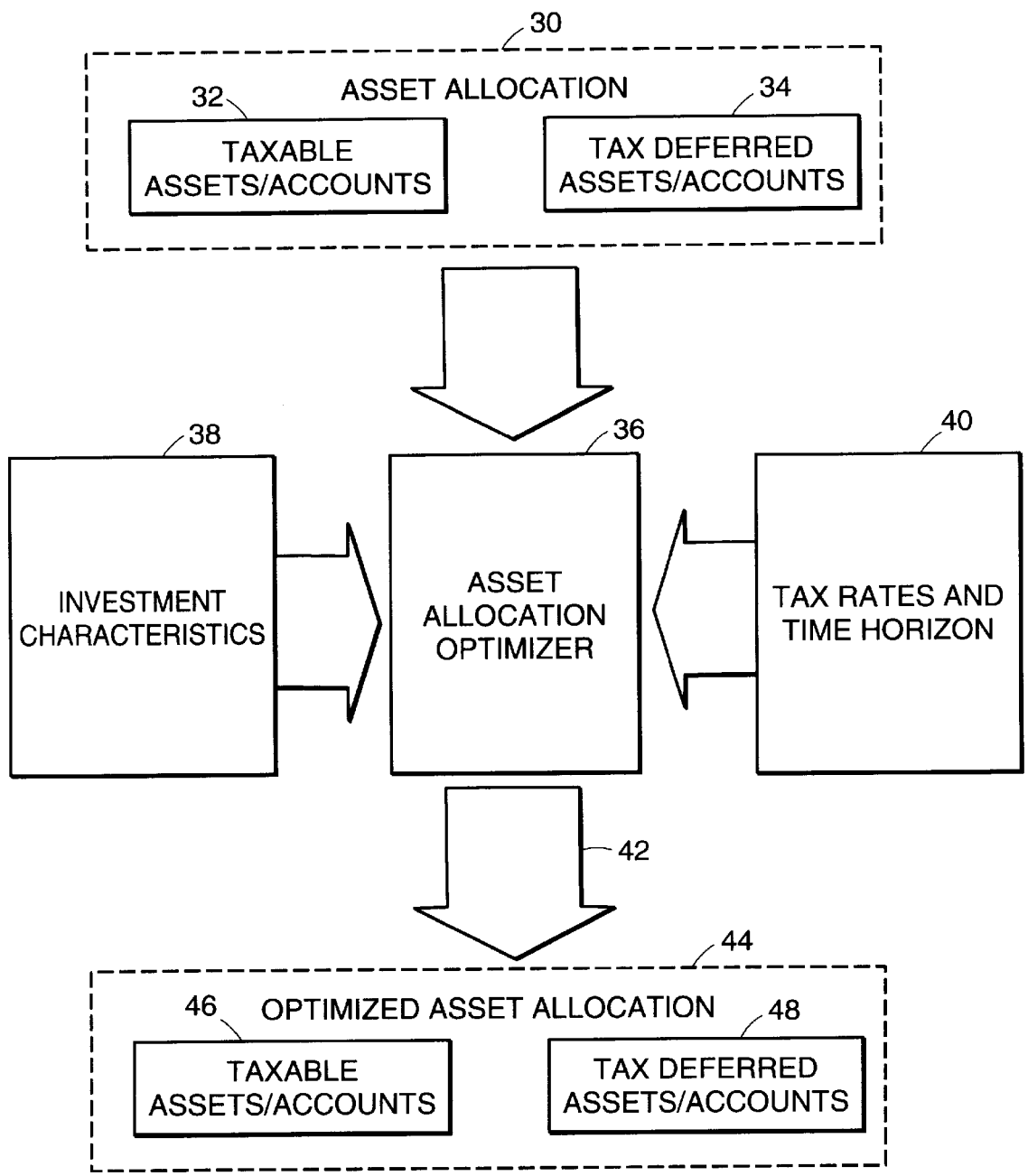
FIG. 2 is a block flow diagram generally showing information inflow and outflow to a system according to the present invention.

FIG. 2 illustrates an asset allocation optimizer 36 according to the present invention. An illustrative embodiment of the present invention starts with a predetermined Asset Allocation 30. This includes taxable assets and accounts 32 and tax deferred assets and accounts 34. Typically, these asset allocations 30 are pre-divided into various categories. For example, an entity (such as a person or business entity) may have funds in a taxable account, where taxes are due each year; and a tax-deferred, where taxes on the principal and/or interest are not due until the funds are withdrawn, or the individual reaches a certain age. The types of accounts for which the present invention is applicable include Taxable, IRA, 401K, Keough, Roth IRAs; trust accounts; foundations; corporate charitable trust accounts; children's accounts.

While these funds are in different accounts 32 and 34, they may be invested in different investments. A feature of the present invention is determining which accounts to use for each investment that results in a maximum after-tax accumulation.

Figure 3:
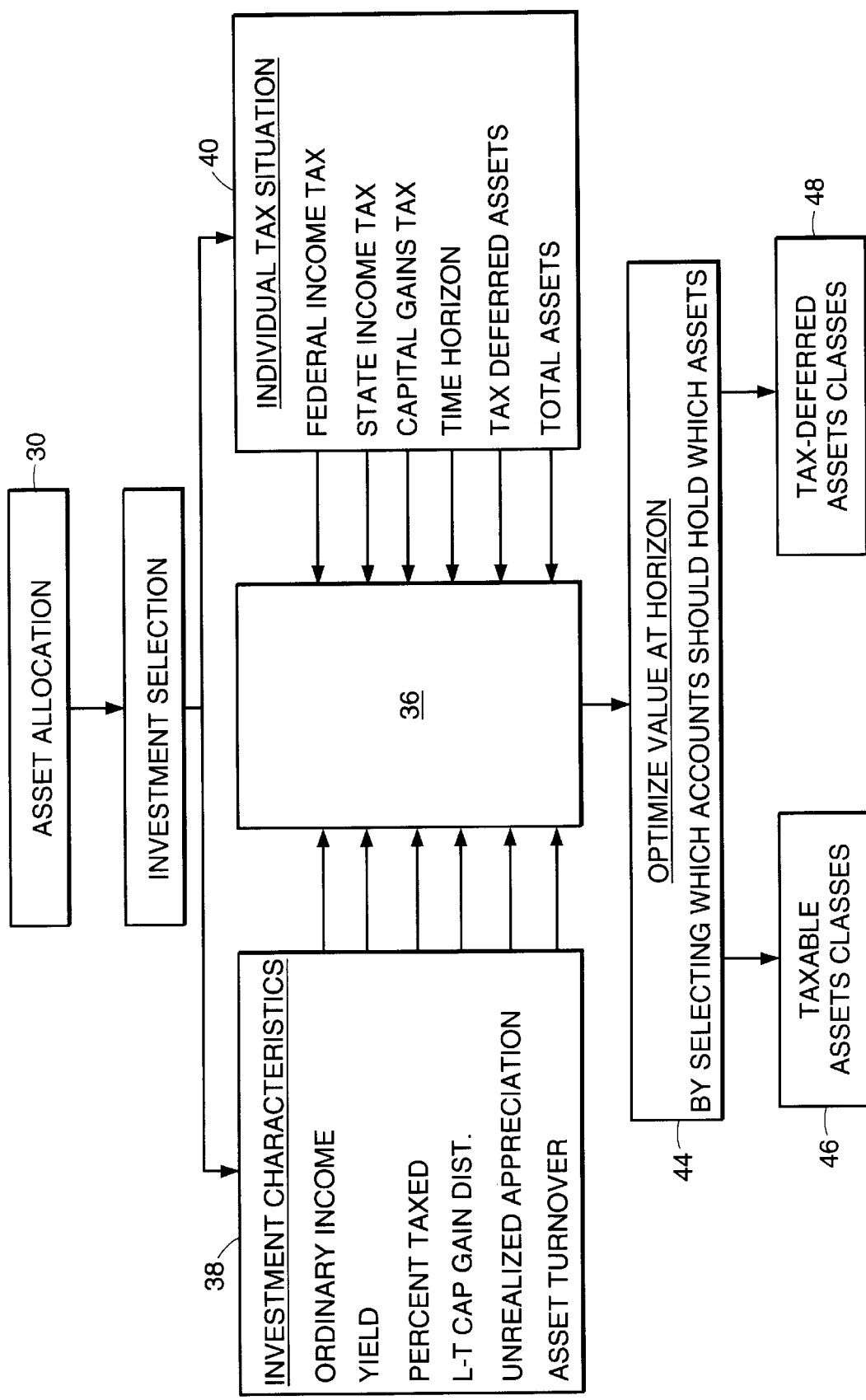
FIG. 3 is a block diagram showing a more detailed flow of information as compared to FIG. 2.

These predetermined asset allocations 30 are provided as input information into an investment location Optimizer 36. Other information input to the investment location Optimizer 36 includes investment characteristics 38. As detailed in FIG. 3, investment characteristics 38 include details about the various selected or potential investments, including ordinary income, yield, percent tax, long term capital gain distributions, unrealized appreciation, and investment turnover. This investment characteristic information 38 is specific to each investment. Such information may be stored in a separate database, or entered specifically for a specific entity.

Other information entered into the investment location Optimizer 36 includes tax rates and time horizon information 40 which generally is peculiar to the individual entity. Such individual information 40 includes the federal income tax rate, state income tax rate, capital gains tax, tax deferred investments (accounts) and total investments for the individual. Other information includes the time horizon which is the period of which to determine the maximal growth. The investment location Optimizer 36, FIG. 2, then determines an optimized solution which is an output 42 in the form of an optimized accumulation 44. This information is similar to the original investment location information 30, except that now the amount of taxable investment accounts 46 and tax deferred investment accounts 48 are selected to produce an optimal result at the end of the time horizon. Other information, including the projected investment value at the time horizon, and percentage improvement, may be output, as will be discussed below.

Figure 4:
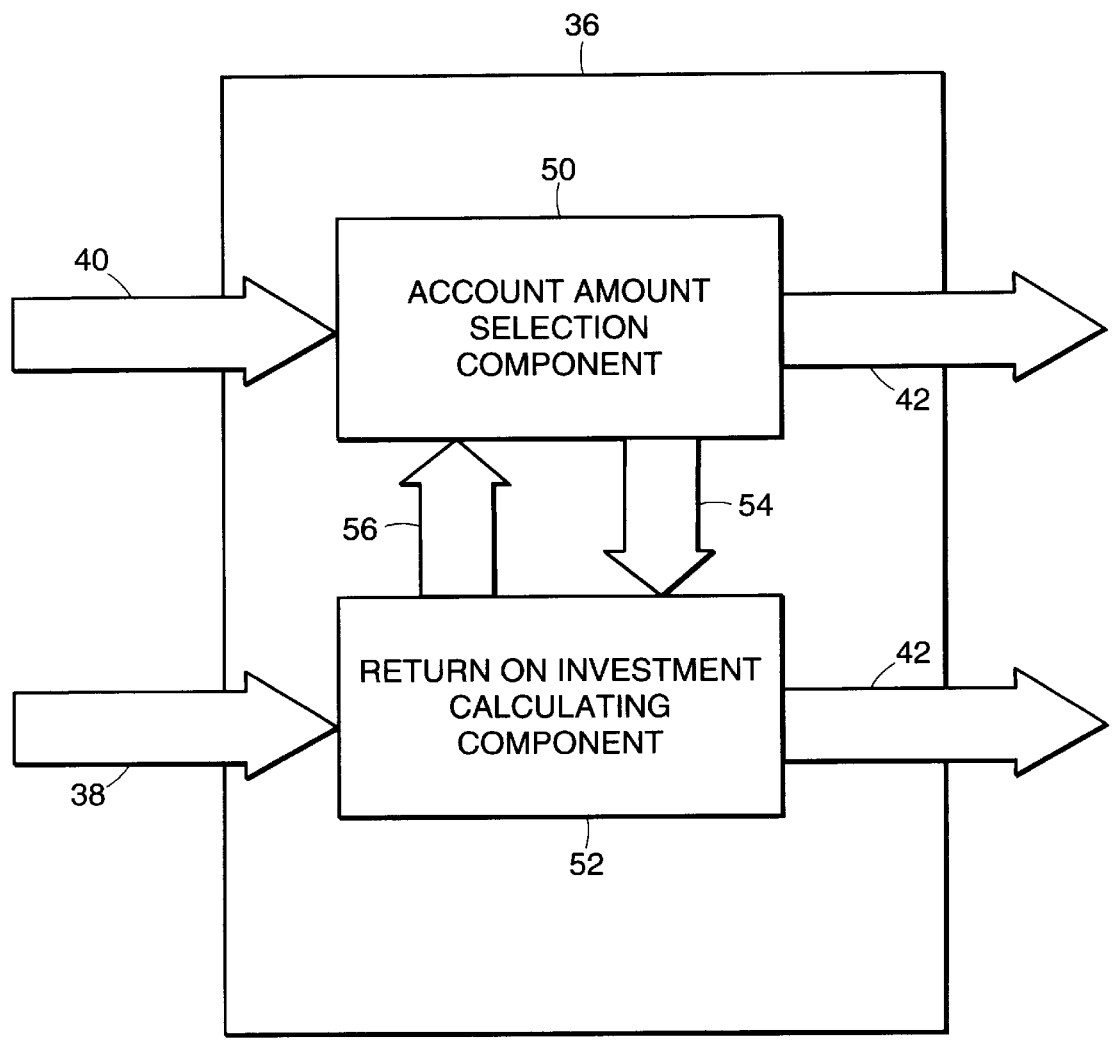
FIG. 4 is a block diagram showing an investment optimizing component according to one embodiment of the present invention.

The investment location optimizer 36, FIG. 4, includes two major components in the illustrative embodiment of the present invention. An account amount selection component 50 receives as input the predetermined investment location 30 and works to adjust the proper investment location to produce an optimal solution. Another component is the return on investment calculating component 52. This return on investment calculating component 52 performs calculations to determine the value of the various investment over the time horizon. Therefore this return on investment calculating component 52 accepts input of the investment characteristics 38 as well as information from the account amount selection component 50 as shown by arrow 54. The return on the investment calculating component 52 performs standard calculations for determining growth based on interest, turnover, and other features of an investment, including the tax characteristics. The information returned by the return on investment calculating component 52 is provided as feedback 56 to the account amount selection component 50, thereby allowing it to receive feedback on various optimizations and determine an optimal solution.

The output 42 from the account amount selection component 50 is in the form of the optimized investment locations which are returned to the user of the system.

Figure 5:
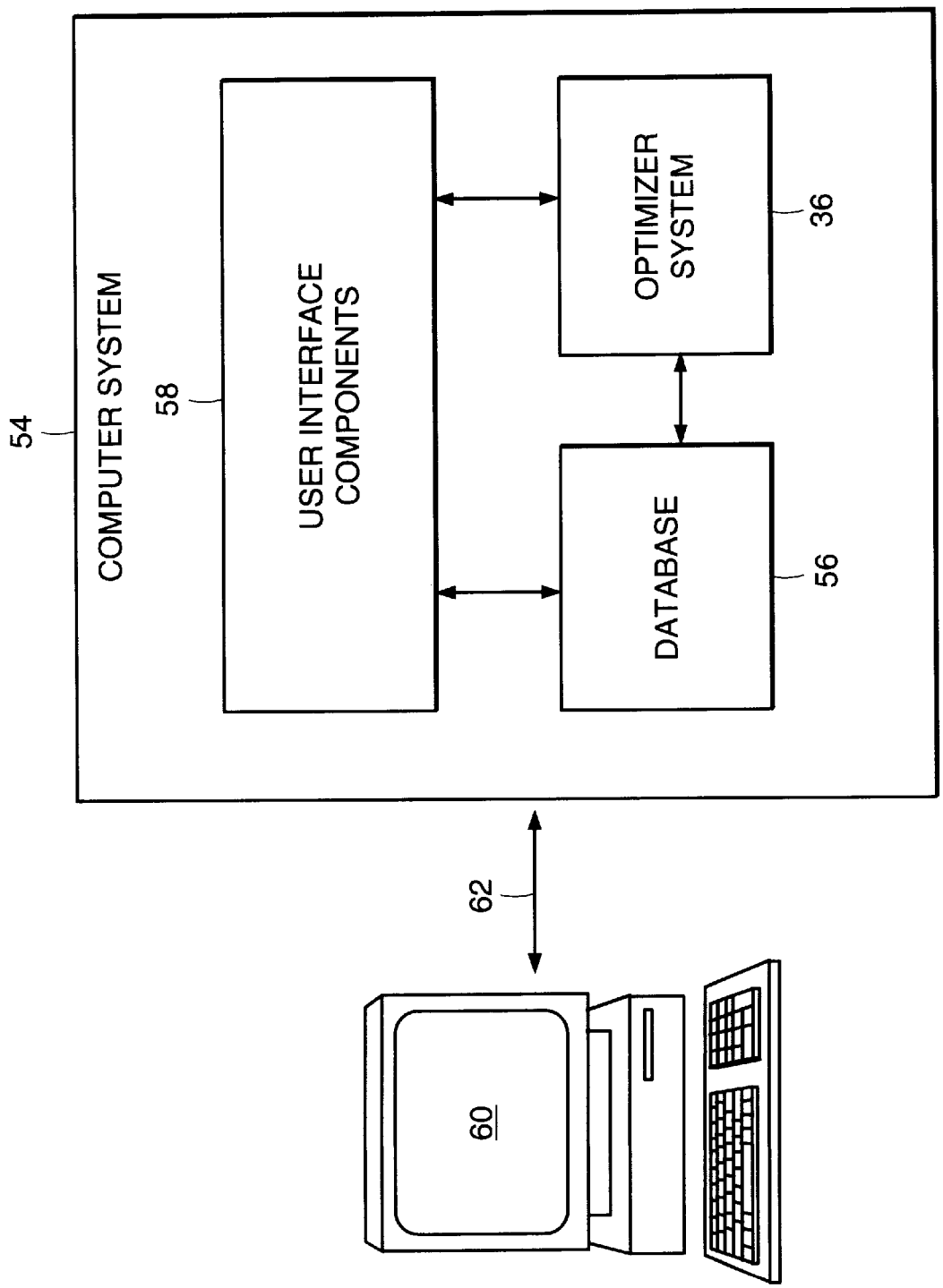
FIG. 5 is a block diagram of a computer system according to one embodiment of the present invention.

A computer system for running an embodiment the present invention is shown in FIG. 5. A user may interact with the system using a workstation or other display, to input information and run the system. A computer system including a user interface application interacts with the user, and stores information regarding accounts and assets in a database. The optimization system interacts with the database to retrieve and store information. The optimization system also may interact directly to the user, either directly or through the user interface application or system.

One embodiment of the asset allocation optimizer 36 uses Monte Carlo simulation to determine an optimized allocation. The account amount selection component 50 generates ranges of percentages of taxable vs. tax-deferred accounts to invest in particular investments. Then the system randomly selects percentages within those ranges, whereupon the return on investment calculating component 52 determines the results based on the randomly selected percentages. This cycle is repeated many times, with the system remembering the best result. The selection of random percentages can be adjusted depending upon the selection process, for example random selections within the range can be uniform (pseudo-random), or skewed, such as logarithmic over the range, or over a normal distribution curve.

An advantage of the Monte Carlo technique is that it can also be applied to variable yields for various investments. For example, an investment stock may have a projected yield, but more likely it will vary over time. The present invention allows investment yield (and other parameters) to be entered as a range, instead of as a specific return. This range can be defined so that random values selected within the range are even distribution, bell curve, stepped, skewed, etc. By using Monte Carlo techniques to factor in volatility of one or more investments and generate realistic samples of the results, a better optimized allocation is produced. Further, results can include a "best case" and "worst case" result, which allows for more prudent allocation decisions.

The Monte Carlo technique may be used alone, or in combination with other optimization techniques, including the GA (Genetic Algorithm) embodiment described below. For example, the Monte Carlo technique is useful for selecting randomly distributed samples used to "seed" the gene pool for GA fitness and cross-breeding evaluations. In other words, to improve the account selection starting point of the present invention.

The illustrative embodiment the present invention uses Genetic Algorithms (GA) to help select an optimized investment allocation. GAs are techniques for solving optimization problems inspired by the theory of evolution and biogenetics. These algorithms are useful for exploring large search spaces for optimal or near optimal solutions. The basics of a genetic algorithm are:

1. Representing possible solutions to problems as a string of parameters (numbers). This string is called a chromosome and the parameters within it are called genes.
2. Randomly creating a number (generation) of these chromosomes.
3. Calculating the effectiveness of each chromosome as a solution to the problem then ranking the chromosomes in order of effectiveness (fitness to survive).
4. Creating a new generation of chromosomes by randomly selecting pairs of chromosomes (parents) and mixing their genes to form child chromosomes. This process is called 'crossover' and the selection of the parents is biased to more effective (fit) parents. Another variation called 'mutation' involves randomly changing one or more genes within a chromosome. Mutation helps GA systems to avoid false solutions and too-narrow convergence on one area of the search space.
5. Repeating steps 3 to 4 for a number of cycles (generations).

The randomness of the above process allows the effective exploration of the space of solutions. While the selection of effective solutions (chromosomes) and the mixing of their genes allows the accumulation of good features from partially good solutions. As a result, genetic algorithms can explore large domains and converge on good solutions relatively quickly. GA's also give a powerful trade off between the time taken to reach a solution and the quality of the solution.

The two basic steps in developing solutions using GA's are an appropriate representation of the problem and a method of assessing the effectiveness (cost) of a solution. The easiest representation of a problem for GA implementation is as a string of numbers. Each number is represented by a gene that can be constrained by the minimum and maximum values it can take. A cost function is defined which derives a value for the cost of the solution from a given set of gene values. In such a representation, each gene represents a different numeric parameter of the solution. Alternatively, a chromosome can be used to represent a sequence of jobs which requires optimization. In such a case the number of genes will equal the number of jobs to be sequenced and the value of each gene will be unique and range from 1 to the number of tasks.

The genetic structure used in the illustrative embodiments a single non-sequence chromosome, named TaxDeferred with a variable number of genes, A CTD (Asset Class Tax Deferred). Each asset class is represented as a gene containing the dollar value in tax deferred accounts on this chromosome. That is, the GA component generates values for the amount in tax deferred accounts for all asset classes, and the cost function written for this application computes both the amount in taxable accounts and the total value for that allocation to taxable and tax deferred accounts. There is applied a sum constraint which requires that the total tax deferred dollars in all genes must add up to the total tax deferred dollars specified by the user. The fitness is the measure of the value at the time horizon.

As previously mentioned, in the illustrative embodiment the initial chromosome is initialized to a set of values that represent the current value in tax deferred accounts in order to provide a reasonable starting point for the optimization. By utilizing current values, the illustrative embodiment converges to an optimal solution within one generation (initial chromosome "pool" created by mutation, and a generation "pool" including crossover). Experiments using two and seven generations showed some improvement over using one generation, with a tradeoff in increased time for computation. Multiple generations may be used for incremental improvements to an optimal solution, or if the current values are not already "optimized" in that the accounts were selected by a naive investor. Therefore the present invention works both for experienced investors and, advisors as well as naive users and may be adjusted accordingly for specific investor types.

The illustrative embodiment of the present invention is implemented using Microsoft Access 97 and XPERTRULE KBS by Attar Software. However, any database could be used for this purpose as could any heuristic problem solving algorithm. The illustrative embodiment runs on a general purpose computer such as an Intel® based processor running a standard operating system such as Microsoft Windows® or Linux. However, the present invention can run on any type of computer system, mainframes to palm computers, or on calculators such as financial calculators. Further, the present invention may be available locally or remotely to users over a network based system such as the internet or modem connections. For example, users can access a web site (either generally or with a personal account number), enter information and run the optimizing system. Users can also store their personal information in secure accounts at the web site.

A full description of the specific GA system used to implement the illustrative embodiment can be found the XPERTRULE Reference Manual Release 3.63, as provided by Attar Software Limited, and is fully incorporated herein by reference. Software applications fall into two categories; analysis and synthesis. Analysis applications are represented by the traditional input/output model of data processing whereby input data is processed procedurally or heuristically to generate the output data. Synthesis applications involve the reverse process of deriving the input data required to generate certain desired outputs. This is a difficult task since there are, in most cases, no formulae or rules to derive inputs from outputs. This is further complicated by constraints imposed on the acceptable values of input data. Optimization is the process of deriving values of input data that satisfy constraints and which results in the desired output data.

The GA component of the illustrative embodiment first computes the portfolio value given the current location of assets between taxable and tax deferred accounts, and stores this for comparison to the final value determined to be best by the cost function.

The GA component then initializes the GA to a set of values that represent the current value in tax deferred accounts in order to provide a reasonable starting point for the optimization. This is not necessary to reach an optimal value, but it seems to speed up the process considerably. In the illustrative embodiment, a first iteration (or pool) of chromosomes is performed for fifty iterations. The iterations differ through random changes (mutations) in the chromosome. A generation is then created, using random crossovers with another set of 50 iterations. This cycle may be repeated as desired.

Now, given a particular set of values of tax deferred dollars in each asset class, the value function determines the total value of the portfolio. If this value is better than previous values, then it is retained as the best solution so far, otherwise, it is discarded.

Computations used by the value function in the illustrative embodiment to reach its conclusions are listed in Appendix A, including valuation functions to compute the future value of various investments including stocks and bonds. For the illustrative embodiment, the GA component writes its conclusion to a file.

Figure 6:
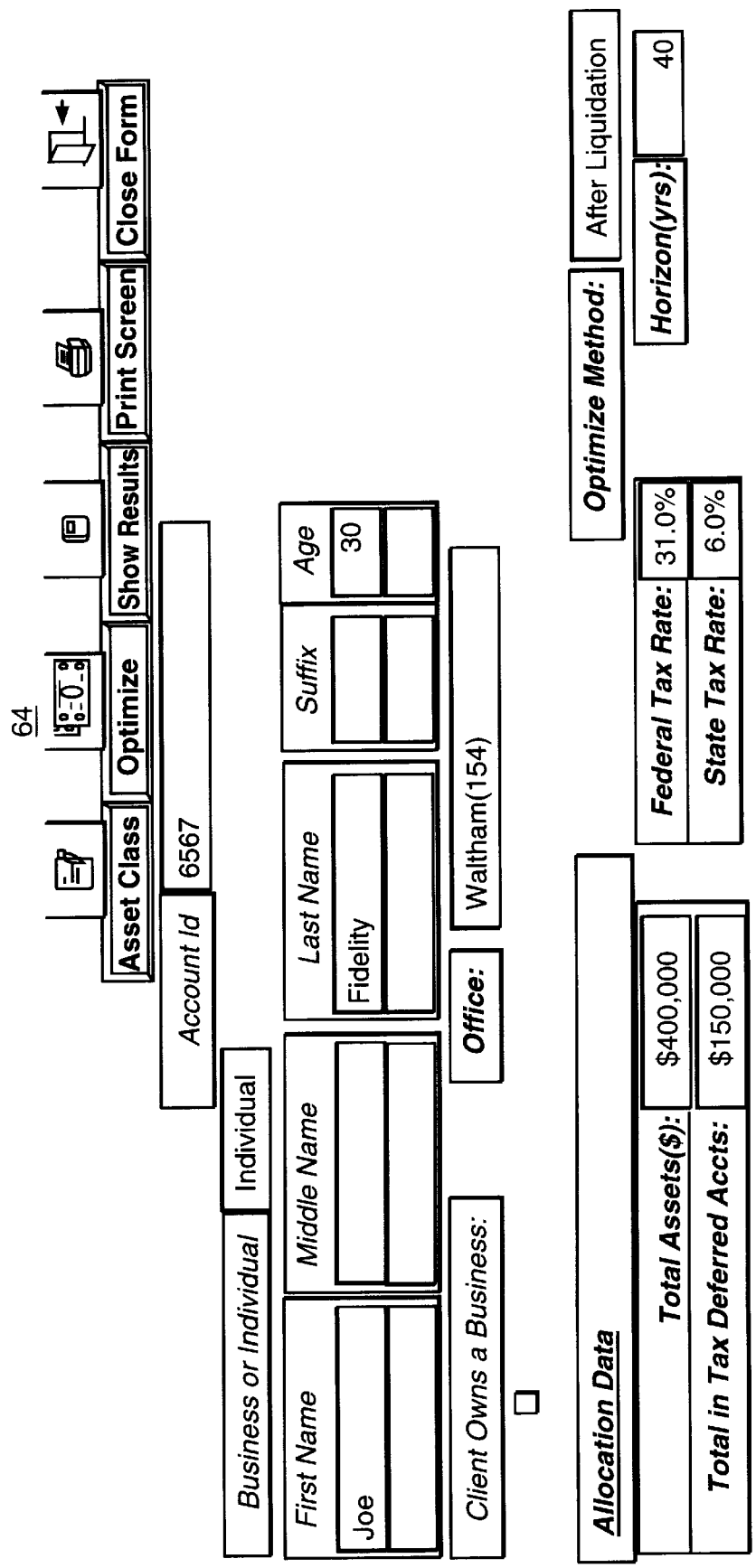
FIG. 6 is a user interface input screen for entering entity data according to an illustrative embodiment of the present invention.

FIG. 6 illustrates a user interface front end for use with an illustrative embodiment of the present invention. As shown in the input window 64, information including an account identification, and a business or individual indication are entered along with the first and last name and age of the entity. This information may be saved in a database to allow future recall and changes. Other information which may be used in calculations or simply for data base entry are also entered. Allocation data including the total assets available and the total assets in a tax deferred account are input along with the (combined or separate) federal and state tax rate for the individual. An optimization method may be entered including after liquidation are also entered. Finally, the time horizon in years is also entered on this screen 64.

Clicking on the button marked 'Asset Class' brings up the following form 66 as shown in FIG. 7, on which the Client'various assets are entered along with the current Taxable/Tax Deferred allocation. There are possibly many user-defined asset classes which generally fall into one of two types: Stock or Bond. For each asset class, the user may enter or select the following data: percent taxed by federal and state governments; ordinary income (dividend) percent; yield percent for bonds; long term capital growth distribution; anticipated unrealized appreciation; percent and amount to be allocated to each asset class; percent and amount currently allocated to taxable and tax deferred accounts; average turnover time; and capital gains tax rate.

Also entered at this stage is a preliminary allocation between the various investments which is shown by label 68. Here, there is a percent allocation between the various investments which will equal approximately 100%. The illustrative embodiment will also calculate the investment amount based on the total assets available based on the percentage as shown by label 70. Alternatively, the amount entered may be entered in monetary units wherein the percentage will be calculated automatically. Finally a current allocation between taxable and tax deferred accounts is entered 72. This provides a starting point for the optimization process and further will provide an ability to view how much the optimization has provided for.

When the user clicks the "Optimize" button on the user input or edit screen 64 FIG. 6, the appropriate data is sent to the optimizing system. In the illustrative embodiment, data is written to an ASCII text file by the database, and are subsequently read by the optimizing system. In subsequent versions, OLE 2 or other protocols may be used for data communication. Prior to optimization, some calculations are done to prepare the data for optimization. This code, written using XPERTRULE KBS, is shown in Appendix A.

FIG. 8 shows the result screen 74 which presents the output from the optimization process. As shown by label 76 for the present example, the investment allocation optimization system was able to provide an 11% improvement over the current strategy with a time horizon extending out to March of 2039. As output by the system, the data as shown by label 78 is a new allocation between the taxable account and tax deferred account which provides more value at the time horizon. In performing these calculations, the optimization system maintains the limits as provided by the account data, for example if an entity wants to invest 25% in a particular investment, then there is not enough assets available in a tax deferred account to fully fund 25% then assets will be distributed from the taxable account to make up the difference. An improvement upon this strategy, is to provide suggestions to the entity to provide more funds available in their tax deferred account should that person's tax situation allow for such a move.

The illustrative embodiment of the present invention was tested with data to check the hypothesis of Evensky, as discussed in the previously cited Wall Street Journal article. Evensky recommended keeping stocks in taxable accounts and bonds in tax-deferred accounts. A scenario was run using data of $200,000 total assets, with $100,000 in tax-deferred accounts. The federal tax rate was 42% and state tax rate 6%, with a horizon of forty years. Two investments were entered, a bond investment returning 6%, and a stock investment returning 13%. The scenario was started with all the tax-deferred assets (50%) in the bond investment, and all the taxable assets (50%) in the stock investment, thereby following Evensky's advice. The results from running the system was very different. The illustrative embodiment instead computed that putting all the taxable assets in the bond investment, and all the tax-deferred assets in the stock investment would results in a growth in value to $7,281,432, which was a 94% improvement over the initial allocation. Therefore, for the example tested here, Evensky's hypothesis is clearly not the best investment strategy.

The present invention includes additions and enhancements which provide more utility for investors and analysts. These additions include different optimization techniques and algorithms, including rule-based expert systems, neural net processing to recognize patterns and learn optimization techniques, fuzzy logic, linear programming, exhaustive search, and various combinations thereof.

Further, different types of accounts may easily be added to the present invention, including Roth IRA, annuities, various trusts, 401k, custodial accounts, 529 investment plans, corporate accounts, etc. Specific investment or class of investments characteristics may be added, for example the system can optimize the type of bond:—i.e., if bonds are best suited for retirement account, then use 6% yielding corporate bonds, if best suited for taxable account and tax bracket $\geq 28\%$, use 4% municipal bonds.

A foreign tax credit feature may be added, wherein the foreign tax credit can only be taken in taxable accounts as an additional input.

Other optimization thresholds and variations are available, include an age 70½ (minimum required distributions), post-retirement investment location optimization. Another optimization is crossover points for all the variables that trigger when one account is better than another. Another optimization is differing time horizons for various accounts. Also, different beneficiary designations on retirement accounts can be factored in, i.e., Roth IRAs distributions could be delayed beyond the owner's death.

Other features of the present invention include input and output of information in standardized formats, for example the Morningstar's or Standard and Poors etc. databases, allowing tie-ins for fund/individual security data such as past returns, turnover, dividend yield, etc. Support for databases and/or spreadsheets of optimized portfolio as well as current portfolio is helpful. Other support includes cash flow analysis, with integration of projected cash flow needs to determine time horizons for various investment accounts, and to integrate with existing software programs that calculate retirement projections or optimal investment mixes etc. Other features include a separate application which integrates into other standard systems, to extract the necessary information and produce results with minimal data entry.

Other features include estate sensitivity, with no taxation on appreciation if assets passed via an estate; gifting, with implications within family at different tax brackets, or to charity to escape taxation on appreciation; tax basis, with current tax basis and related tax bite to be factored in when determining optimal account location; and tax-loss deductibility, to be factored in if securities decline in value; different tax rates for different time periods; alternative minimum tax if applicable. Obviously, as tax laws change, new optimization features will become useful with the present invention. The software could also accommodate entirely different tax systems from other countries, along with exchange rates as necessary.

Other features include a "solve it" function, for example to determine what minimum rate of return is needed before stock should be in retirement account or any other variable in the program; simultaneous optimization of asset allocation with investment location; factoring in of ongoing cash inflows and outflows, a rebalancing feature, which ties in anticipated rebalancing needs with current optimizations; and a tax efficiency calculator, to determine for example how much greater of an investment return does Fund A need to offset its tax inefficiency when compared to Fund B.

Although the invention has been shown and described with respect to illustrative embodiments thereof, various other changes, omissions and additions in the form and detail thereof may be made therein without departing from the spirit and scope of the invention.

Appendix A

Precalculation data processing:

```
@FOpen 'c:\tanager\multis.txt',1,FileNum
@For i =1 To ACs
    @FRead
FileNum,EOF,AssetClass[i,1],AssetDesc[i,1],
    AssetCategory[i,1],TotalAssetsPct[i,1],ACAssetsTol[i,1
    ],Appreciation [i,1],Dividend[i,1],
CapGainstax[i,1],Yield[i,1],CGDist[i,1],TaxBracket[i,1],
    Clt_Id ,Turnover[i,1],CurrTax[i,1],CurrTaxDef[i,1]
    @If Turnover[i,1]=0.0
        @Assign Turnover[i,1]=Horizon
    @EndIf
    @Assign YieldPlus1[i,1]=1.0+Yield[i,1]
    @rem debug YieldPlus1[i,1]+'='+'1.0'+'+'+Yield[i,1]
    @Assign YieldPlus1[i,1]=YieldPlus[i,1]^Horizon
    @rem debug YieldPlus1[i,1]+'='+YieldPlus1[i,1]+'^'+
        Horizon
    @Assign HorizonMinus1=Horizon −1
    @Assign DividendPlus1[i,1]=Dividend[i,1]+1.0
    @Assign AppreciationPlus1[i,1]=Appreciation[i,1]+1.0
    @Assign ValueAfterTaxMult[i,1]+(Appreciation[i,1]+
        (Dividend[i,1]−(Dividend[i,1]*TaxBracket[i,1]))+
        (CGDist[i,1]−(CGDist[i,1]*CapGainstax[i,1])))
    @rem debug ValueAfterTaxMult[i,1]
    @Assign ValueAfterTaxMultPlus1[i,1]=1.0+
        ValueAfterTaxMult[i,1]
    @Assign     ValueAfterTaxMultPlus1[i,1]=
        ValueAfterTaxMultPlus1[i,1]^Horizon
    @rem debug ValueAfterTaxMultPlus1[i,1]
    @Assign StockRate[i,1]=Appreciation[i,1]+Dividend[i,
        1]+CGDist[i,1]
    @Assign StockRatePlus1[i,1]=StockRate[i,1]+1.0
    @Assign StockRatePlus1[i,1]=StockRatePlus1[i,1]
        ^Horizon
    @Assign StockApprRateOnGoing[i,1]=Appreciation[i,
        1]−(Appreciation[i,1]*CapGainstax[i,1])
```

@Assign StockApprRateOnGoingPlus1[i,1]=
  StockApprRateOnGoing[i,1]+1.0
@Assign StockDivRateOnGoing[i,1]=Dividend[i,1]-
  (Dividend[i,1]*TaxBracket[i,1])
@Assign StockDivRateOnGoingPlus1[i,1]=
  StockDivRateOnGoing[i,1]+1.0
@Assign StockGrowthRateOnGoing[i,1]=Appreciation
  [i,1]+StockDivRateOnGoing[i,1]
@Assign StockGrowthRateOnGoingPlus1[i,1]=
  StockGrowthRateOnGoing[i,1]+1.0
@Assign BondRateOnGoing1[i,1]=Yield[i,1]-(Yield[i,1]
  *TaxBracket[i,1])
@debug BondRateOnGoing[i,1]+'='+Yield[i,1]+'-('+
  Yield[i,1]+'*'+TaxBracket+')'
@Assign BondRateOnGoingPlus1[i,1]=
  BondRateOnGoing[i,1]+1.0
@debug BondRateOnGoingPlus1[i,1]+'='+
  BondRateOnGoing[i,1]+'+'+'1.0'
@Assign BondRateOnGoingPlus1[i,1]=
  BondRateOnGoingPlus1[i,1]^Horizon
@debug BondRateOnGoingPlus1[i,1]+'='+
  BondRateOnGoingPlus1[i,1]+'^'+Horizon
@rem debug AssetClass[i,1]+"+AssetDesc[i,1]+"+
  TotalAssetsPct[i,1]+"+ACAssetsTo1[i,1]+"+
  Appreciation[i,1]+"+Dividend[i,1]+"+CapGainstax[i,
  1]+"+Yield[i,1]+"+AssetCategory[i,1]+"+CGDist[i,
  1]+"+TaxBracker[i,1]+"+Clt_Id+"+Turnover[i,1]+"+
  CurrTax[i,1]+"+CurrTaxDef[i,1]
@Next I
Initialization
@rem debug 'Starting Initialisation . . . '
@DelFile 'C:\tanager\results.txt', 1
@Assign LethalValue =0.0
@Assign ACsMinus1=ACs-1
@Assign Tmax=TotalAssets-TDmax
@Assign ValueBest=0.0
@Do AllocateClasses_prc
@Do CurrentValue_prc
@Do WriteInitial¯prc
AllocateClasses_prc
@rem **** PERCENT OF ASSETS IN EACH ASSET
  CLASS
@For i=1 To ACs
  @Assign ACAssets[i,1]=TotalAssets*TotalAssetsPct[i,1]
  @rem debug ACAssets[i,1]+'='+TotalAssets+'*'+
    TotalAssetsPct[i,1]
@Next I
CurrentValue_prc
@rem debug '**** DETERMINE VALUE OF CLIENT
  CURRENT ALLOCATION'
@For i=1 To ACs
  @Assign ACT[i,1]=CurrTax[i,1]
  @Assign ACTD[i,1]=CurrTaxDef[i,1]
  @rem debug ACT[i,1]+"+ACTD[i,1]
@Next
i
@rem debug 'Doing ValueForCurrent_prc'
@Do ValueForCurrent¯prc
@For i=1 To ACs
  @Assign ACTCurrBest[i,1]=ACTBest[i,1]
  @Assign ACTDCurrBest[i,1]=ACTDBest[i,1]
  @Assign ACValueCurrBest[i,1]=ACValueBest[i,1]
  @rem debug ACTCurrBest[i,1]+"+ACTDCurrBest[i,1]+
    "+ACValueCurrBest[i,1]
@Next i
@Assign ValueCurrBest=ValueBest
@rem debug ValueCurrBest
@rem debug '**** REINITIALIZE'
@Assign ValueBest=0.0
@For i=1 To ACs
  @If AssetDesc[i,1]='Municipal'
    @Assign ACT[i,1]=ACTD[i,1]+ACT[i,1]
    @Assign ACTD[i,1]=0.0
  @EndIf
@Clear Value
@rem InitArray ACT
@rem InitArray ACTD
@InitArray ACTBest
@InitArray ACTDBest
@InitArray ACValueBest
WriteInitial_prc
@rem **** WRITE INITIAL GENERATION FILE
@FOpen 'c:\tanager\initgen.txt', 2, FileNum
@rem for k=1 To 50
  @Assign ACInit[1,1]=CurrTaxDef[i,1]
  @Str ACInit[1,1], StgNum
  @Assign InitGen=StgNum
  @For i=2 To ACs
    @Assign ACInit[i,1]=CurrTaxDef[i,1]
    @Str ACInit[i,1], StgNum
    @Assign InitGen=InitGen +', '+StgNum
  @Next i
  @FWrite FileNum, InitGen
@rem Next k
@FClose FileNum
Value Function
@Assign Value=0.1
@rem **** The GA generates values for ACTD, and we
  calculate ACT.
@For i=1 To ACs
  @Assign ACT[i,1]=ACAssets[i,1]-ACTD[i,1]
  @rem debug ACT[i,1]+'='+ACAssets[i,1]+'-'+ACTD[i,
    1]
@Next i
@Do Lethal_prc
@Assign Terminate='No'
@IF Value< >LethalValue
  @rem **** Loop through all Assets Classes
  @For i=1 To ACs
    @rem **** Check for Stock or Bond
    @If AssetCategory[i,1]='Stock'
      @Do ValueStock_prc
    @Else
      @Do ValueBond_prc
    @EndIf
    Assign Value=Value+ACValue[i,1]
    @rem debug 'i='+i+#10+'ACTD[i,1]='+ACTD[i,1]+
      #10+'ACT[i,1]='+ACT[i,1]+#10+'Value='+Value+
      'Value='+ValueBest
  @Next i
  @rem debug 'i='+i+#10+'ACTD[i,1]='+ACTD[i,1]+
    #10+'ACT[i,1]='+ACT[i,1]+#10+'Value='+Value+
    'ValueBest='+ValueBest
  IF (Value< >LethalValue) AND (Value>ValueBest)
    @Assign ValueBest=Value
    @For i=1 To ACs
      @Assign ACTBest[i,1]=ACT[i,1]
      @Assign ACTDBest[i,1]=ACTD[i,1]

```
    @Assign ACValueBest[i,1]=ACValue[i,1]
  @Next i
 @Endif
@ENDIF
Lethal_prc Procedure
@Assign Terminate='No'
@Assign TDTotal=0.0
@For i=1 To ACs
  @If (ACTD[i,1]<b 0) or (ACTD[i,1]>ACAssets[i,1])
    @Assign Terminate='Yes'
  @Else
    @Assign TDTotal=TDTotal+ACTD[i,1]
  @EndIf
@Next i
@rem if (TaxBracket[i,1]=0) and (ACTD[i,1]< >ACAssets
   [i,1])
  @rem Assign Value=LethalValue
@rem EndIf
@If (TDTotal>TDmax) OR (Terminate='Yes')
  @Assign Value=LethalValue
@EndIf
ValueStock_prc Procedure
@rem **** COMPUTE SIMPLE FUTURE VALUE
@Assign ACTDBase[i,1]=ACTD[i,1]*StockRatePlus1[i,1]
@If Turnover[i,1]=Horizon
  @rem '**** TAXABLE STOCKS'
  @If OptMethod='Liq'
    @rem **COMPUTE BASE VALUE AT HORIZON
    @Assign BaseValue[i,1]=1+Appreciation[i,1]+
      Dividend[i,1]+CGDist[i,1]
    @Assign BaseValue[i,1]=ACT[i,1]*BaseValue[i,1]
      ^Horizon
    @rem ** COMPUTE TAXABLE CAPITAL GAIN
    @Assign AppreciationValue[i,1]=(1+Appreciation[i,
      1]+CGDist[i,1])
    @Assign AppreciationValue[i,1]=ACT[i,1]
      *AppreciationValue[i,1]^Horizon
    @rem ** COMPUTE CAP GAINS TAX
    @Assign CapGainOnTaxableStocks[i,1]=
      AppreciationValue[i,1]*CapGainstax[i,1]
    @rem ** COMPUTE DIVIDENDS
    @Assign DividendVal[i,1]=Dividend*TaxBracket
    @Assign DividendVal[i,1]=1+Dividend−DividendVal
      [i,1]
    @Assign DividendVal[i,1]=ACT[i,1]*DividendVal[i,
      1]^Horizon
    @rem **** COMPUTE ACTUAL VALUE OF TAX-
      ABLE STOCKS
    @Assign ACTValue[i,1]=AppreciationValue[i,1]−
      CapGainOnTaxableStocks[i,1]+DividendVal[i,1]
    @rem debug 'ACT[i,1]:'+ACT[i,1]+#10+'BaseValue
      [i,1]:'+BaseValue[i,1]+#10+'AppreciationValue[i,1]
      :'+AppreciationValue[i,1]+#10+'CapGainstax[i,1]
      :'+CapGainstax[i,1]+#10+
      'CapGainOnTaxableStocks[i,1]]:'+
      CapGainOnTaxableStocks[i,1]+#10+'DividendVal
      [i,1]:'+DividendVal[i,1]+#10+'ACTValue[i,1]:'+
      ACTValue[i,1]
  @Else
    @Assign    ACTValue[i,1]=ACT[i,1]
      *ValueAfterTaxMultPlus1[i,1]
  @EndIf
@Else
  @DO TurnOver_prc
@EndIf
@rem **** TAX DEFERRED STOCKS
@If OptMethod='Liq'
  @Assign TaxOnTaxDefStocks[i,1]=ACTDBase[i,1]
    *TaxBracket[i,1]
  @Assign ACTDValue[i,1]=ACTDBase[i,1]−
    TaxOnTaxDefStocks[i,1]
@Else
  @Assign ACTDValue[i,1]=ACTDBase[i,1]
@EndIf
@rem *** FINAL VALUE
@Assign ACValue[i,1]=ACTValue[i,1]+ACTDValue[i,1]
ValueBond_prc Procedure
@rem COMPUTE SIMPLE FUTURE VALUE
@Assign ACTDBase[i,1]=ACTD[i,1]*YieldPlus1[i,1]
@rem **** TAXABLE BONDS
@If OptMethod='Liq'
  @Assign    ACTValue[i,1]=ACT[i.1]
    *BondRateOnGoingPlus1[i,1]
  @rem debug i+':'+ACTValue[i,1]+'='+ACT[i,1]+'*'+
    BondRateOnGoingPlus1[i,1]
  @rem Assign ACTTax[i,1]=(ACTValue[i,1]−ACT[i,1])
    *TaxBracket[i,1]
  @rem Assign ACTValue[i,1]=ACTValue[i,1]−ACTTax[i,
    1]
@Else
  @Assign    ACTValue[i,1]=ACT[i,1]
    *BondRateOnGoingPlus1[i,1]
@EndIf
@rem *** TAX DEFERRED BONDS
@If OptMethod='Liq'
  @Assign ACTDTax[i,1]=ACTDBase[i,1]*TaxBracket[i,
    1]
  @Assign ACTDValue[i,1]=ACTDBase[i,1]−ACTDTax
    [i,1]
  @rem debug ACTDTax[i,1]+'='+ACTDBase[i,1]+'*'+
    TaxBracket[i,1]
  @rem debug ACTDValue[i,1]+'='+ACTDBase[i,1]+'−'+
    ACTDTax[i,1]
@Else
  @Assign ACTDValue[i,1]=ACTDBase[i,1]
@EndIf
@rem **** FINAL VALUE
@Assign ACValue[i,1]=ACTValue[i,1]+ACTDValue[i,1]
@rem debug ACValue[i,1]+'='+ACTValue[i,1]+'+'+
  ACTDValue[i,1]
```

What is claimed is:

1. A system, for running on a computer, for determining an investment strategy for an entity with assets in taxable and tax-deferred accounts, comprising:

an account information input component, to accept information regarding said assets in said taxable and tax-deferred accounts for said entity;

an investment selection input component, to accept information regarding a plurality of investments, including an indication of a percentage amount of said assets to invest in each of said plurality of investments;

an account amount selection component, to determine an amount to invest from said taxable accounts and tax-deferred accounts in each of said plurality of investments, wherein said determined amounts substantially match said indications of a percentage amount to invest in each of said plurality of investments;

a time horizon input component, to accept an indication of a time horizon; and a return on investment calculation component, to calculate a return on investment for said entity based on said information regarding said assets, said information regarding a plurality of investments, said indication of a percentage amount, said selected amount to invest from said taxable and said tax-deferred accounts, and said indication of a time horizon;

wherein said account amount selection component determines an amount from said taxable and tax-deferred accounts in order to produce a maximal after-tax accumulation for said entity at said time horizon.

2. The system of claim 1 wherein said account amount selection component randomly selects amounts from said taxable and tax-deferred accounts, and said return on investment calculation component calculates an after-tax accumulation for said entity based on said randomly selected amounts.

3. The system of claim 2 wherein steps of randomly selecting amounts from said taxable and tax-deferred accounts, and calculating a return, are performed a plurality of times, and said system outputs selected amounts from said taxable and tax-deferred accounts which produce a maximal return.

4. The system of claim 1 wherein said account amount selection component selects an amount from said taxable and tax-deferred accounts using Genetic Algorithms (GA) in order to produce a maximal return on investment for said entity at said time horizon.

5. The system of claim 4 further including:
a chromosome structure, for use with said Genetic Algorithms, wherein said chromosome structure includes a plurality of values, each value being an indication of an amount from said tax-deferred accounts to invest in a selected one of said plurality of investments; and
said return on investment calculation component calculates an after-tax accumulation for said entity based on said values in said chromosome structure.

6. The system of claim 1 further including:
a personal tax component, to accept information regarding personal tax rates for said entity, wherein said a return on investment calculation component calculates a return on investment for said entity based on said information regarding said personal tax rates.

7. The system of claim 1 wherein said system also determines an improvement value of said after-tax accumulation based on said selected amounts from said taxable and tax-deferred accounts over an initial after-tax accumulation based on initial selected amounts from said taxable and tax-deferred accounts.

8. On a computer system, a method of determining an investment strategy for an entity with assets in taxable and tax-deferred accounts, said method comprising:
receiving information regarding a plurality of investments;
receiving information regarding a percentage amount of said assets to invest in each of said plurality of investments;
receiving information regarding a time horizon; and
for each of said plurality of investments, determining an amount to invest from said taxable and tax-deferred accounts in said investment, wherein said determined amount to invest substantially matches said percentage amount to invest in said investment;
wherein said determinations will produce a substantially maximal after-tax accumulation for said entity at said time horizon.

9. The method of claim 8 wherein said step of determining an amount to invest from said taxable and tax-deferred accounts includes calculating tax consequences over said time horizon for said entity based on said amounts to invest.

10. The method of claim 8 wherein said step of determining an amount to invest from said taxable and tax deferred accounts further includes:
performing sampling steps a plurality of times, said sampling steps comprising:
randomly selecting amounts from said tax-deferred accounts to invest in each of said plurality of investments;
determining appropriate amounts from said taxable accounts so that said selected percentage amounts for each of plurality of investments is satisfied; and
determining a result if said amounts were invested as selected and determined for said time horizon.

11. The method of claim 8 wherein said step of determining an amount to invest from said taxable and tax deferred accounts further includes:
creating a plurality of GA chromosome structures, each GA chromosome structure including a value for each of said plurality of investments, each value being an indication of an amount from said tax-deferred accounts to invest in said corresponding investment;
setting said values in said plurality of GA chromosome structures to initial settings;
evaluating fitness of said plurality of GA chromosome structures;
selecting at least one of said GA chromosome structures with an optimal fitness; and
using said values from said selected GA chromosome structure as amounts from said tax-deferred accounts to invest in said corresponding investment for said substantially maximal accumulation.

12. The method of claim 11 wherein said initial settings for said values are provided by a user.

13. The method of claim 11 wherein said initial settings for said values are randomly generated.

14. The method of claim 11 further including the step of:
calculating an improvement value of said substantially maximal after-tax accumulation based on said determined investment amounts from said taxable and tax-deferred accounts, as compared to an after-tax accumulation based on said initial settings.

* * * * *